(12) United States Patent
Bae

(10) Patent No.: US 6,697,635 B2
(45) Date of Patent: Feb. 24, 2004

(54) METHOD AND APPARATUS FOR FORWARD AND REVERSE POWER CONTROL IN MOBILE TELECOMMUNICATION SYSTEM

(75) Inventor: Eun Hae Bae, Jaeju-do (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 501 days.

(21) Appl. No.: 09/738,084

(22) Filed: Dec. 15, 2000

(65) Prior Publication Data
US 2001/0006898 A1 Jul. 5, 2001

(30) Foreign Application Priority Data
Dec. 29, 1999 (KR) .............................. 99-64647

(51) Int. Cl.[7] ............................... H04B 7/00
(52) U.S. Cl. ....................... 455/522; 455/69
(58) Field of Search ................ 455/522, 69, 13.4, 455/24, 551, 463, 552.1, 561; 370/318, 310, 335

(56) References Cited

U.S. PATENT DOCUMENTS

| 5,056,109 | A | * | 10/1991 | Gilhousen et al. .......... 370/342 |
| 5,862,453 | A | | 1/1999 | Love et al. |
| 5,982,760 | A | * | 11/1999 | Chen .......................... 370/335 |
| 6,301,486 | B1 | * | 10/2001 | Tanaka ....................... 455/522 |
| 6,452,958 | B1 | * | 9/2002 | van Nee ..................... 375/130 |
| 6,603,980 | B1 | * | 8/2003 | Kitagawa et al. .......... 455/522 |

* cited by examiner

Primary Examiner—Nay Maung
Assistant Examiner—Tan Trinh
(74) Attorney, Agent, or Firm—Merchant & Gould P.C.

(57) ABSTRACT

A method and apparatus for forward and reverse power control in a mobile telecommunication system, wherein the transfer of power control data between a multi-mode demodulator board assembly and multi-user modulator board assembly installed in a base station is implemented on the basis of an independent power control bus, resulting in the occurrence of no time delay during the power control data transfer. Therefore, a mobile station is reduced in power loss, thereby enhancing the quality of speech.

5 Claims, 4 Drawing Sheets

FIG. 5
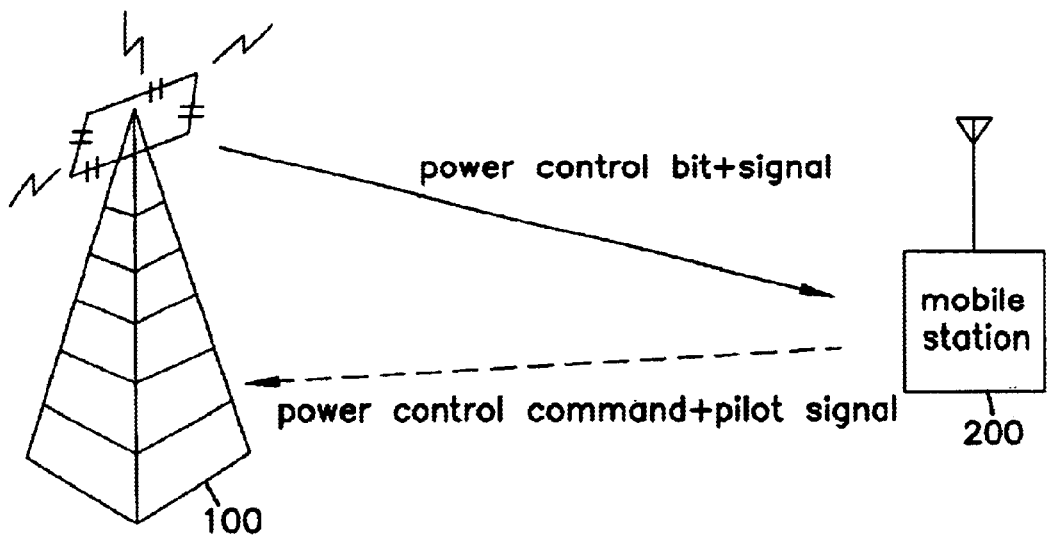
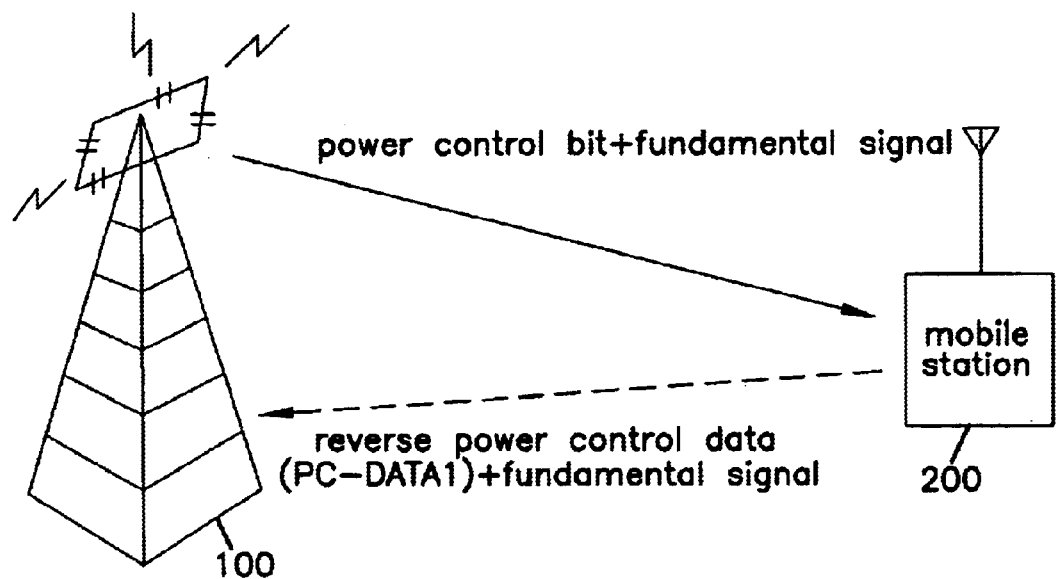
FIG. 6

METHOD AND APPARATUS FOR FORWARD AND REVERSE POWER CONTROL IN MOBILE TELECOMMUNICATION SYSTEM

BACKGROUND OF THE INVENTION

1. Field of the Invention

The present invention relates in general to forward and reverse power control in a mobile telecommunication system, and more particularly to a method and apparatus for forward and reverse power control in a mobile telecommunication system, wherein the transfer of power control data between a multi-mode demodulator board assembly (referred to hereinafter as "MMDA") and multi-user modulator board assembly (referred to hereinafter as "MUMA") installed in a base station is implemented on the basis of an independent power control bus, resulting in the occurrence of no time delay during the power control data transfer.

2. Description of the Prior Art

In a mobile telecommunication system, generally, forward and reverse power control is performed to optimize a cell capacity, solve a near-far problem and corner problem and minimize interferences with neighboring cells so as to obtain a large capacity of speech and a good quality of speech. In other words, because signal transmission from a base station to subscriber terminals is subjected to losses different than respective mobile stations, the output of the base station must be controlled to provide such sufficient signal strength that each subscriber terminal can maintain an appropriate signal quality. The base station can perform such a function by controlling power allocation to each forward traffic channel. On the other hand, a reverse link is influenced by independent fading that is different from the forward link because respective signals are propagated along different paths, resulting in a difference between power levels. Further, a reverse signal from a near mobile station can be received by the base station at a power level higher than that from a far mobile station since it is less in path loss than that from the far mobile station. Such a reverse signal of the higher power level causes a considerable degree of interferences with signals from other mobile stations that are received by the base station at lower power levels. For this reason, the output of a reverse traffic channel must be controlled in such a manner that signals transmitted from all mobile stations in a speech sphere can be received by a receiver of the base station at the same average power level irrespective of propagation losses and locations of the associated mobile stations.

With reference to FIG. 1, there is shown in block form the construction of a conventional apparatus for forward and reverse power control in a mobile telecommunication system. In this drawing, the reference numeral 10 denotes a base station and the reference numeral 20 denotes a mobile station. The base station 10 comprises a radio frequency (referred to hereinafter as "RF") transmitter/receiver unit 11, multi-mode demodulator board assembly (MMDA) 12 and multi-user modulator board assembly (MUMA) 13.

The conventional forward/reverse power control apparatus with the above-mentioned construction employs a dual port random access memory (RAM) system for the forward and reverse power control. Namely, for the forward and reverse power control, the MMDA writes power control data into its own dual port RAM and the MUMA reads the power control data from the dual port RAM at an interval of 10 ms. As a result, a time delay of 10 ms occurs in each transfer of link power control data. Consequently, the power control is reduced in speed, resulting in a loss in power and, thus, degradation in quality of speech of mobile stations.

SUMMARY OF THE INVENTION

Therefore, the present invention has been made in view of the above problems, and an objective of the present invention is to provide a method and apparatus for forward and reverse power control in a mobile telecommunication system, wherein the forward and reverse power control can be more rapidly performed, thereby reducing a loss in power and thus enhancing the quality of speech of mobile stations.

In accordance with one aspect of the present invention, the above and other objectives can be accomplished by a provision of a method for forward power control in a mobile telecommunication system which comprises a radio frequency transmitter/receiver unit for performing power control data transmission/reception operations, a multi-mode demodulator board assembly (MMDA) for generating forward power control data, and a multi-user modulator board assembly (MUMA) for adjusting a power level of an associated base station according to the forward power control data generated by the MMDA, the method comprising the steps of (a) allowing the MMDA to analyze a power control command, received by the radio frequency transmitter/receiver unit over a pilot channel, and generate the forward power control data as a result of the analysis; (b) allowing the MMDA to transfer the generated forward power control data to the MUMA over a power control bus; and (c) allowing the MUMA to receive the forward power control data from the MMDA over the power control bus and adjust a power level of the associated base station according to a value of the received forward power control data.

In accordance with another aspect of the present invention, a method is provided for reverse power control in a mobile telecommunication system which comprises a radio frequency transmitter/receiver unit for performing power control data transmission/reception operations, a multi-mode demodulator board assembly (MMDA) for generating reverse power control data, and a multi-user modulator board assembly (MUMA) for receiving the reverse power control data generated by the MMDA and bypassing it to the radio frequency transmitter/receiver unit, the method comprising the steps of (a) allowing the MMDA to compare a reception gain value contained in a power control bit, received by the radio frequency transmitter/receiver unit over a fundamental channel, with its threshold value and generate the reverse power control data as a result of the comparison; (b) allowing the MMDA to transfer the generated reverse power control data to the MUMA over a power control bus; (c) allowing the MUMA to receive the reverse power control data transferred from the MMDA over the power control bus and bypass it to the radio frequency transmitter/receiver unit; and (d) allowing the radio frequency transmitter/receiver unit to receive the reverse power control data from the MUMA and transmit it to a mobile station over the fundamental channel, whereby the mobile station receives the reverse power control data over the fundamental channel and adjusts its power level according to a value of the received reverse power control data.

In accordance with a further aspect of the present invention, an apparatus is provided for forward power control in a mobile telecommunication system comprising a radio frequency transmitter/receiver unit for performing power control data transmission/reception operations, a multi-mode demodulator board assembly (MMDA) for analyzing a power control command, received by the radio frequency transmitter/receiver unit over a pilot channel, and generating forward power control data as a result of the analysis, and a multi-user modulator board assembly (MUMA) for adjusting a power level of an associated base station according to the forward power control data generated by the MMDA, wherein the apparatus further comprises an independent power control bus for connecting a power control data output terminal of the MMDA to a power control data input terminal of the MUMA.

In accordance with a further aspect of the present invention, an apparatus is provided for reverse power control in a mobile telecommunication system comprising a radio frequency transmitter/receiver unit for performing power control data transmission/reception operations, a multi-mode demodulator board assembly (MMDA) for comparing a reception gain value contained in a power control bit, received by the radio frequency transmitter/receiver unit over a fundamental channel, with its threshold value and generating reverse power control data as a result of the comparison, and a multi-user modulator board assembly (MUMA) for receiving the reverse power control data generated by the MMDA and bypassing it to the radio frequency transmitter/receiver unit, wherein the apparatus further comprises an independent power control bus for connecting a power control data output terminal of the MMDA to a power control data input terminal of the MUMA.

In accordance with another aspect of the present invention, a method is provided for forward power control in a mobile telecommunication system which comprises a base station including a radio frequency transmitter/receiver unit for performing power control data transmission/reception operations, a multi-mode demodulator board assembly (MMDA) for generating forward power control data and a multi-user modulator board assembly (MUMA) for adjusting a power level of the base station according to the forward power control data generated by the MMDA, and a mobile station for receiving the forward power control data from the base station and transmitting a power control command to the base station over a pilot channel, the method comprising the steps of (a) allowing the MUMA to determine whether the forward power control is required; (b) returning to the step (a) if it is determined at the step (a) that the forward power control is not required and allowing the MUMA to transmit a power control bit over the pilot channel to the mobile station via the radio frequency transmitter/receiver unit if it is determined at the step (a) that the forward power control is required; (c) allowing the mobile station to receive the power control bit transmitted from the radio frequency transmitter/receiver unit in the base station over the pilot channel, compare a digital gain value contained in the received power control bit with its threshold value, generate the power control command as a result of the comparison and transmit it to the radio frequency transmitter/receiver unit over the pilot channel; (d) allowing the radio frequency transmitter/receiver unit to receive the power control command transmitted from the mobile station over the pilot channel and transfer it to the MMDA; (e) allowing the MMDA to receive the power control command from the radio frequency transmitter/receiver unit, analyze it and generate the forward power control data as a result of the analysis; (f) allowing the MMDA to transfer the generated forward power control data to the MUMA over a power control bus; and (g) allowing the MUMA to receive the forward power control data from the MMDA over the power control bus and adjust a power level of the base station according to a value of the received forward power control data.

In accordance with still another aspect of the present invention, a method is provided for reverse power control in a mobile telecommunication system which comprises a base station including a radio frequency transmitter/receiver unit for performing power control data transmission/reception operations, a multi-mode demodulator board assembly (MMDA) for generating reverse power control data and a multi-user modulator board assembly (MUMA) for receiving the reverse power control data generated by the MMDA and bypassing it to the radio frequency transmitter/receiver unit, and a mobile station for transmitting a power control bit to the base station over a fundamental channel, receiving the reverse power control data transmitted from the radio frequency transmitter/receiver unit in the base station and adjusting its power level according to the received reverse power control data, the method comprising the steps of (a) allowing the mobile station to determine whether the reverse power control is required; (b) returning to the step (a) if it is determined at the step a) that the reverse power control is not required and allowing the mobile station to transmit the power control bit over the fundamental channel to the radio frequency transmitter/receiver unit in the base station if it is determined at the step (a) that the reverse power control is required; (c) allowing the radio frequency transmitter/receiver unit to receive the power control bit transmitted from the mobile station over the fundamental channel and transfer it to the MMDA; (d) allowing the MMDA to receive the power control bit transferred from the radio frequency transmitter/receiver unit, compare a reception gain value contained in the received power control bit with its threshold value and generate the reverse power control data as a result of the comparison; (e) allowing the MMDA to transfer the generated reverse power control data to the MUMA over a power control bus; (f) allowing the MUMA to receive the reverse power control data transferred from the MMDA over the power control bus and bypass it to the radio frequency transmitter/receiver unit; (g) allowing the radio frequency transmitter/receiver unit to receive the reverse power control data from the MUMA and transmit it to the mobile station over the fundamental channel; and (h) allowing the mobile station to receive the reverse power control data transmitted from the base station over the fundamental channel and adjust its power level according to a value of the received reverse power control data.

BRIEF DESCRIPTION OF THE DRAWINGS

The above and other objects, features and advantages of the present invention will be more clearly understood from the following detailed description taken in conjunction with the accompanying drawings, in which:

FIG. 5 is a view showing an embodiment of the forward power control method of FIG. 3; and FIG. 6 is a view showing an embodiment of the reverse power control method of FIG. 4.

DETAILED DESCRIPTION OF THE PREFERRED EMBODIMENTS

It should be noted that the present method and apparatus for forward and reverse power control in a mobile telecommunication system is particularly appropriate for application to a code division multiple access (CDMA) system employing a band spreading technique.

Figure 1:
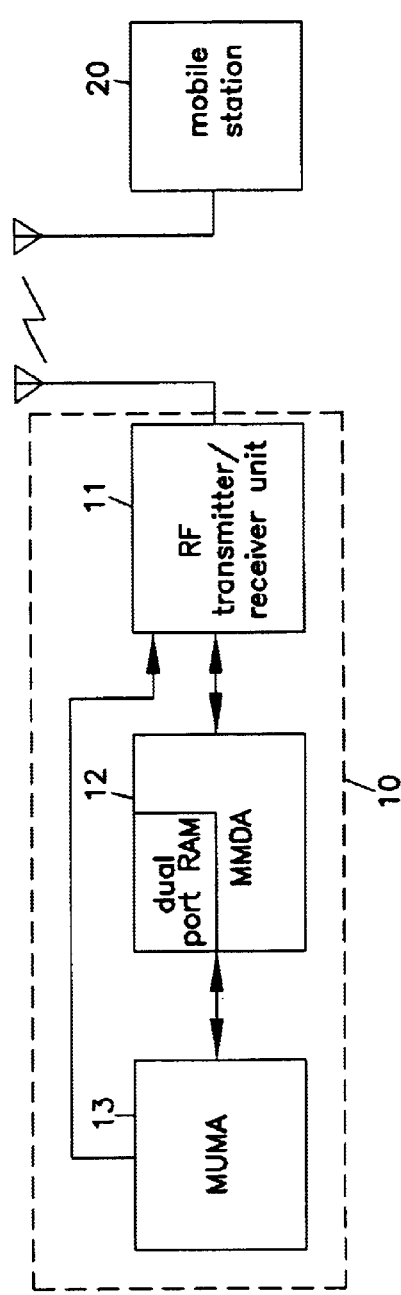
FIG. 1 is a block diagram showing the construction of a conventional apparatus for forward and reverse power control in a mobile telecommunication system.
Figure 2:
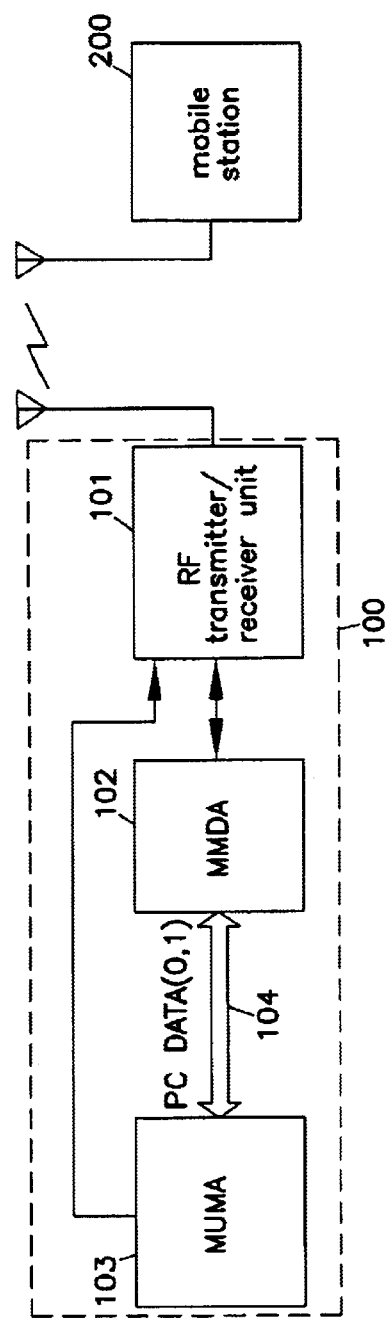
FIG. 2 is a block diagram showing the construction of an apparatus for forward and reverse power control in a mobile telecommunication system in accordance with the present invention.

With reference to FIG. 2, there is shown in block form the construction of an apparatus for forward and reverse power control in a mobile telecommunication system in accordance with the present invention.

In FIG. 2, the reference numeral 100 denotes a base station and the reference numeral 200 denotes a mobile station. The base station 100 comprises an RF transmitter/receiver unit 101, MMDA 102, MUMA 103 and power control bus 104.

In more detail, in the forward power control arrangement of the mobile telecommunication system in accordance with the present invention, the MMDA 102 is connected to a power control data input terminal of the MUMA 103 via the independent power control bus 104 to transfer forward power control data to the MUMA 103 over the power control bus 104 for the forward power control.

In the forward power control arrangement of the present invention, the RF transmitter/receiver unit 101 installed in the base station 100 receives a power control bit from the MUMA 103 and transmits it to the mobile station 200 over a pilot channel. Upon receiving a power control command from the mobile station 200 over the pilot channel after a predetermined period of time elapses, the RF transmitter/receiver unit 101 transfers the received power control command to the MMDA 102.

The MMDA 102 installed in the base station 100 is connected to the power control data input terminal of MUMA 103 via the independent power control bus 104, as stated previously. For the forward power control, the MMDA 102 receives and analyzes the power control command transferred from the RF transmitter/receiver unit 101. Then, the MMDA 102 generates forward power control data PC_DATA0 as a result of the analysis and transfers it to the MUMA 103 over the independent power control bus 104 at an interval of 1.25 ms.

The MUMA 103 installed in the base station 100 is connected to a power control data output terminal of MMDA 102 via the independent power control bus 104. For the forward power control, the MUMA 103 transmits the power control bit over the pilot channel to the mobile station 200 through the RF transmitter/receiver unit 101. Upon receiving the forward power control data PC_DATA0 from the MMDA 102 over the independent power control bus 104 after a predetermined period of time elapses, the MUMA 103 adjusts a power level of the associated base station 100 according to a value of the received forward power control data PC_DATA0. For example, the MUMA 103 raises the power level of the associated base station 100 by a predetermined value if the value of the received forward power control data PC_DATA0 is "0" and lowers the power level of the associated base station 100 by the predetermined value if the value of the received forward power control data PC_ DATA0 is "1".

The power control bus 104 installed in the base station 100 functions to connect the power control data output terminal of the MMDA 102 to the power control data input terminal of the MUMA 103.

For the forward power control, the mobile station 200 receives the power control bit transmitted from the base station 100 over the pilot channel and compares a digital gain value Eb/No contained in the received power control bit with its threshold value Eb/No. Then, the mobile station 200 generates the power control command as a result of the comparison and transmits it to the RF transmitter/receiver unit 101 in the base station 100 over the pilot channel.

On the other hand, in the reverse power control arrangement of the mobile telecommunication system in accordance with the present invention, the MMDA 102 is connected to a power control data input terminal of the MUMA 103 via the independent power control bus 104 to transfer reverse power control data to the MUMA 103 over the power control bus 104 for the reverse power control.

For the reverse power control, the RF transmitter/receiver unit 101 installed in the base station 100 receives a power control bit from the mobile station 200 over a fundamental channel and transfers it to the MMDA 102. Upon receiving reverse power control data PC_DATA1 from the MUMA 103 after a predetermined period of time elapses, the RF transmitter/receiver unit 101 transmits the received reverse power control data PC_DATA1 to the mobile station 200 over the fundamental channel.

For the reverse power control, the MMDA 102 installed in the base station 100 receives the power control bit transferred from the RF transmitter/receiver unit 101 and compares a reception gain value Eb/No contained in the received power control bit with its threshold value Eb/No. Then, the MMDA 102 generates the reverse power control data PC_DATA1 as a result of the comparison and transfers it to the MUMA 103 over the independent power control bus 104 at an interval of 1.25 ms.

The MUMA 103 installed in the base station 100 is connected to a power control data output terminal of MMDA 102 via the independent power control bus 104. For the reverse power control, the MUMA 103 receives the reverse power control data PC_DATA1 transferred from the MMDA 102 over the independent power control bus 104 and transmits it over the fundamental channel to the mobile station 200 via the RF transmitter/receiver unit 101.

The power control bus 104 installed in the base station 100 acts to connect the power control data output terminal of the MMDA 102 to the power control data input terminal of the MUMA 103.

For the reverse power control, the mobile station 200 transmits the power control bit to the RF transmitter/receiver unit 101 in the base station 100 over the fundamental channel. After a predetermined period of time elapses, the mobile station 200 receives the reverse power control data PC_DATA1 from the MUMA 103, transmitted via the RF transmitter/receiver unit 101, over the fundamental channel and adjusts its power level according to a value of the received reverse power control data PC_DATA1. For example, the mobile station 200 raises its power level by a predetermined value if the value of the received reverse power control data PC_DATA1 is "0" and lowers its power level by the predetermined value if the value of the received reverse power control data PC_DATA1 is "1".

Next, a detailed description will be given of a method for forward power control in a mobile telecommunication system in accordance with the present invention with reference to FIGS. 3 and 5.

Figure 3:
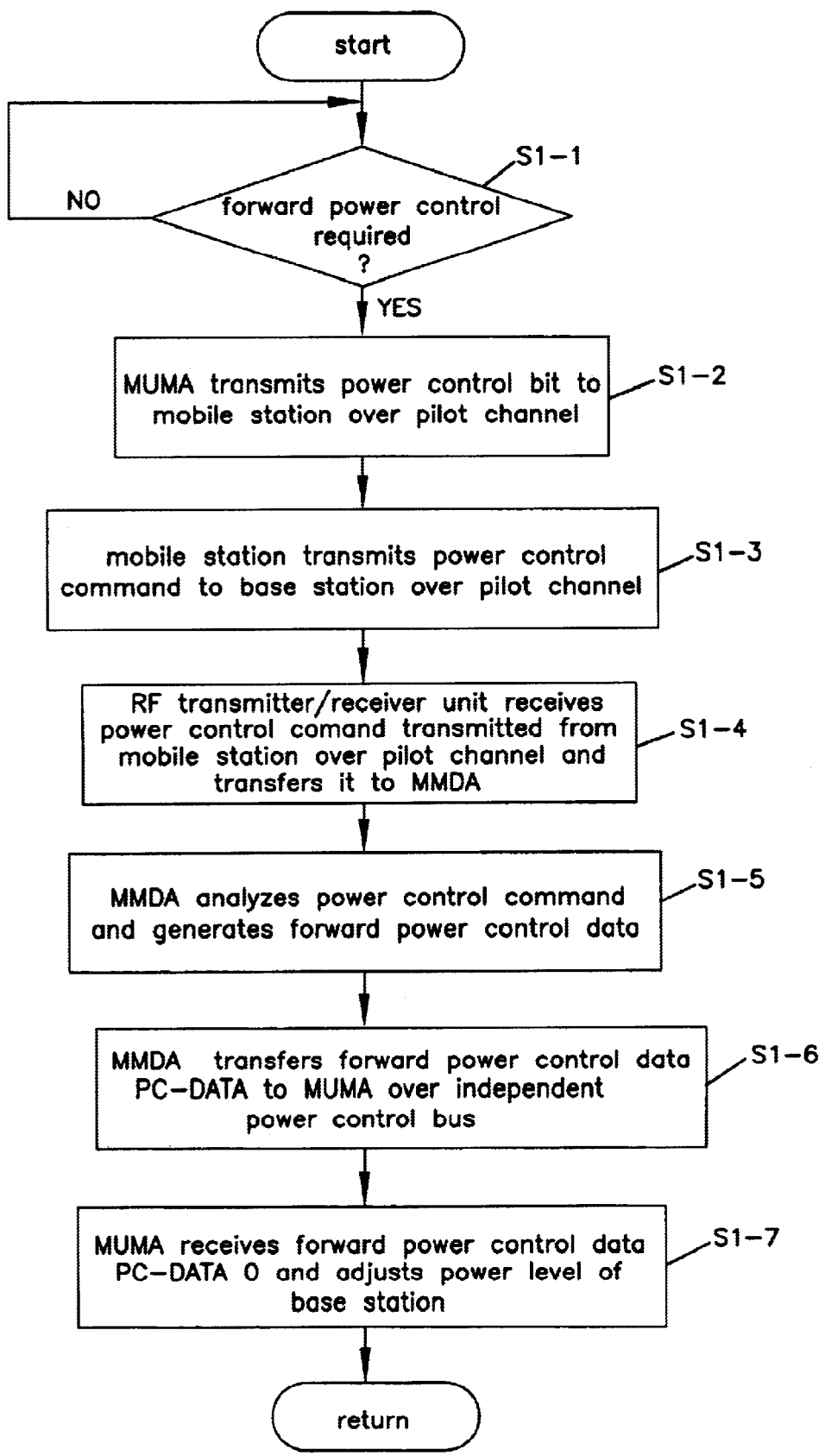
FIG. 3 is a flowchart illustrating a method for forward power control in a mobile telecommunication system in accordance with the present invention.

FIG. 3 is a flowchart illustrating a method for forward power control in a mobile telecommunication system in accordance with the present invention and FIG. 5 is a view showing an embodiment of the forward power control method of FIG. 3.

First, at step S1-1, the MUMA 103 detects the level of power of an audio, character or video signal transmitted from the mobile station 200 and determines whether the forward power control is required as a result of the detection.

If it is determined at the above step S1-1 that the forward power control is not required, the MUMA 103 returns to the above step S1-1. However, in the case where it is determined at the above step S1-1 that the forward power control is required, the MUMA 103 transmits a power control bit over a pilot channel to the mobile station 200 via the RF transmitter/receiver unit 101, as shown in FIG. 5, at step S1-2.

Then, at step S1-3, the mobile station 200 receives the power control bit transmitted from the RF transmitter/receiver unit 101 in the base station 100 over the pilot channel and compares a digital gain value Eb/No contained in the received power control bit with its threshold value Eb/No. Thereafter, the mobile station 200 generates a power control command as a result of the comparison and transmits it to the RF transmitter/receiver unit 101 in the base station 100 over the pilot channel, as shown in FIG. 5.

Subsequently, the RF transmitter/receiver unit 101 in the base station 100 receives the power control command transmitted from the mobile station 200 over the pilot channel and transfers it to the MMDA 102 at step S1-4.

Upon receiving the power control command from the RF transmitter/receiver unit 101, the MMDA 102 analyzes it and generates forward power control data PC_DATA0 as a result of the analysis at step S1-5.

Thereafter, the MMDA 102 transfers the generated forward power control data PC_DATA0 to the MUMA 103 over the power control bus 104 at an interval of 1.25 ms at step S1-6.

Upon receiving the forward power control data PC_DATA0 from the MMDA 102 over the power control bus 104, the MUMA 103 adjusts a power level of the associated base station 100 according to a value of the received forward power control data PC_DATA0 at step S1-7. For example, the MUMA 103 raises the power level of the associated base station 100 by a predetermined value if the value of the received forward power control data PC_DATA0 is "0" and lowers the power level of the associated base station 100 by the predetermined value if the value of the received forward power control data PC_DATA0 is "1". Then, the MUMA 103 returns to the initial state.

Therefore, the above-stated forward power control in the mobile communication system in accordance with the present invention is repetitively performed during telephone conversation.

Next, a detailed description will be given of a method for reverse power control in a mobile telecommunication system in accordance with the present invention with reference to FIGS. 4 and 6.

Figure 4:
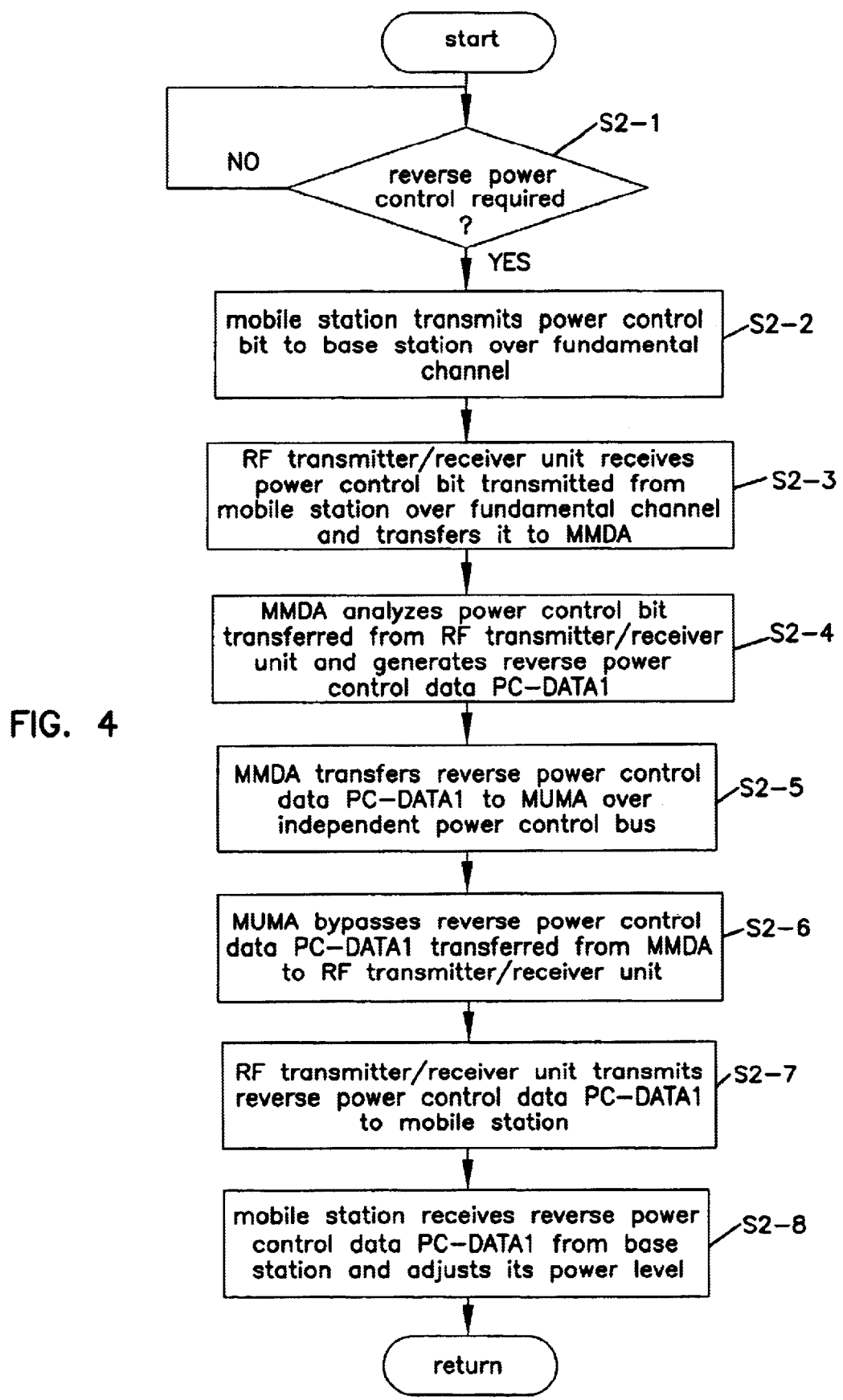
FIG. 4 is a flowchart illustrating a method for reverse power control in a mobile telecommunication system in accordance with the present invention.

FIG. 4 is a flowchart illustrating a method for reverse power control in a mobile telecommunication system in accordance with the present invention and FIG. 6 is a view showing an embodiment of the reverse power control method of FIG. 4.

First, at step S2-1, the mobile station 200 detects the level of power of an audio, character or video signal transmitted from the base station 100 and determines whether the reverse power control is required as a result of the detection.

If it is determined at the above step S2-1 that the reverse power control is not required, the mobile station 200 returns to the above step S2-1. However, in the case where it is determined at the above step S2-1 that the reverse power control is required, the mobile station 200 transmits a power control bit to the RF transmitter/receiver unit 101 in the base station 100 over a fundamental channel, as shown in FIG. 6, at step S2-2.

Then, the RF transmitter/receiver unit 101 in the base station 100 receives the power control bit transmitted from the mobile station 200 over the fundamental channel and transfers it to the MMDA 102 at step S2-3.

Upon receiving the power control bit transferred from the RF transmitter/receiver unit 101, the MMDA 102 compares a reception gain value Eb/No contained in the received power control bit with its threshold value Eb/No and generates reverse power control data PC_DATA1 as a result of the comparison at step S2-4.

Subsequently, the MMDA 102 transfers the generated reverse power control data PC_DATA1 to the MUMA 103 over the power control bus 104 at an interval of 1.25 ms at step S2-5.

Upon receiving the reverse power control data PC_DATA1 transferred from the MMDA 102 over the power control bus 104, the MUMA 103 bypasses it to the RF transmitter/receiver unit 101 at step S2-6.

Then, the RF transmitter/receiver unit 101 receives the reverse power control data PC_DATA1 from the MUMA 103 and transmits it to the mobile station 200 over the fundamental channel at step S2-7.

The mobile station 200 receives the reverse power control data PC_DATA1 from the base station 100 over the fundamental channel and adjusts its power level according to a value of the received reverse power control data PC_DATA1 at step S2-8. For example, the mobile station 200 raises its power level by a predetermined value if the value of the received reverse power control data PC_DATA1 is "0" and lowers its power level by the predetermined value if the value of the received reverse power control data PC_DATA1 is "1". Then, the mobile station 200 returns to the initial state.

Therefore, the above-stated reverse power control in the mobile communication system in accordance with the present invention is repetitively performed during telephone conversation.

As apparent from the above description, the present invention provides a method and apparatus for forward and reverse power control in a mobile telecommunication system, wherein the transfer of power control data between a multi-mode demodulator board assembly and multi-user modulator board assembly installed in a base station is implemented on the basis of an independent power control bus, resulting in the occurrence of no time delay during the power control data transfer. Therefore, a mobile station is reduced in power loss, thereby enhancing the quality of speech.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for forward power control in a mobile telecommunication system which comprises a radio frequency transmitter/receiver unit for performing power control data transmission/reception operations, a multi-mode demodulator board assembly (MMDA) for generating forward power control data, and a multi-user modulator board assembly (MUMA) for adjusting a power level of an associated base station according to the forward power control data generated by said MMDA, said method comprising the steps of:

(a) allowing said MMDA to analyze a power control command, received by said radio frequency transmitter/receiver unit over a pilot channel, and generate said forward power control data as a result of the analysis;

(b) allowing said MMDA to transfer the generated forward power control data to said MUMA over a power control bus; and (c) allowing said MUMA to receive said forward power control data from said MMDA over said power control bus and adjust a power level of the associated base station according to a value of the received forward power control data.

2. The method as set forth in claim 1, wherein said MMDA is adapted to transfer said forward power control data to said MUMA at an interval of 1.25 ms.

3. A method for forward power control in a mobile telecommunication system which comprises a base station including a radio frequency transmitter/receiver unit for performing power control data transmission/reception operations, a multi-mode demodulator board assembly (MMDA) for generating forward power control data and a multi-user modulator board assembly (MUMA) for adjusting a power level of said base station according to the forward power control data generated by said MMDA, and a mobile station for receiving said forward power control data from said base station and transmitting a power control command to said base station over a pilot channel, said method comprising the steps of:

(a) allowing said MUMA to determine whether the forward power control is required;

(b) returning to said step (a) if it is determined at said step (a) that the forward power control is not required and allowing said MUMA to transmit a power control bit over said pilot channel to said mobile station via said radio frequency transmitter/receiver unit if it is determined at said step (a) that the forward power control is required;

(c) allowing said mobile station to receive said power control bit transmitted from said radio frequency transmitter/receiver unit in said base station over said pilot channel, compare a digital gain value contained in the received power control bit with its threshold value, generate said power control command as a result of the comparison and transmit it to said radio frequency transmitter/receiver unit over said pilot channel;

(d) allowing said radio frequency transmitter/receiver unit to receive said power control command transmitted from said mobile station over said pilot channel and transfer it to said MMDA;

(e) allowing said MMDA to receive said power control command from said radio frequency transmitter/receiver unit, analyze it and generate said forward power control data as a result of the analysis;

(f) allowing said MMDA to transfer the generated forward power control data to said MUMA over a power control bus; and (g) allowing said MUMA to receive said forward power control data from said MMDA over said power control bus and adjust a power level of said base station according to a value of the received forward power control data.

4. The method as set forth in claim 3, wherein said MMDA is adapted to transfer said forward power control data to said MUMA at an interval of 1.25 ms.

5. An apparatus for forward power control in a mobile telecommunication system comprising a radio frequency transmitter/receiver unit for performing power control data transmission/reception operations, a multi-mode demodulator board assembly (MMDA) for analyzing a power control command, received by said radio frequency transmitter/receiver unit over a pilot channel, and generating forward power control data as a result of the analysis, and a multi-user modulator board assembly (MUMA) for adjusting a power level of an associated base station according to said forward power control data generated by said MMDA, wherein said apparatus further comprises an independent power control bus for connecting a power control data output terminal of said MMDA to a power control data input terminal of said MUMA.

* * * * *